(12) United States Patent
Oberoi

(10) Patent No.: US 11,851,132 B2
(45) Date of Patent: Dec. 26, 2023

(54) GEAR MECHANISM, PEDAL-POWERED VEHICLE COMPRISING THE SAME, AND METHOD FOR FORMING THE SAME

(71) Applicant: Bhushan Kumar Oberoi, Singapore (SG)

(72) Inventor: Bhushan Kumar Oberoi, Singapore (SG)

(73) Assignee: BHUSHAN KUMAR OBEROI, Singapore (SG)

( * ) Notice: Subject to any disclaimer, the term of this patent is extended or adjusted under 35 U.S.C. 154(b) by 104 days.

(21) Appl. No.: 17/300,163

(22) PCT Filed: Aug. 1, 2019

(86) PCT No.: PCT/SG2019/050385
§ 371 (c)(1),
(2) Date: Apr. 7, 2021

(87) PCT Pub. No.: WO2020/081004
PCT Pub. Date: Apr. 23, 2020

(65) Prior Publication Data
US 2021/0380197 A1    Dec. 9, 2021

(30) Foreign Application Priority Data

Oct. 19, 2018   (SG) .......................... 10201809244W

(51) Int. Cl.
*B62M 1/30*     (2013.01)
*B62M 11/04*    (2006.01)
(Continued)

(52) U.S. Cl.
CPC .............. *B62M 1/36* (2013.01); *B62M 3/003* (2013.01); *B62M 11/04* (2013.01)

(58) Field of Classification Search
CPC .......... B62M 1/30; B62M 1/36; B62M 11/02; B62M 11/04; B62M 2003/006; B62M 3/003
See application file for complete search history.

(56) References Cited

U.S. PATENT DOCUMENTS 3,083,985 A * 4/1963 Tung .......................... B62M 1/30
                                                280/258
3,888,136 A * 6/1975 Lapeyre .................... B62M 3/02
                                                74/594.1
(Continued)

FOREIGN PATENT DOCUMENTS

CN    1374228 A  * 10/2002
CN    1425587 A  *  6/2003
(Continued)

*Primary Examiner* — Adam D Rogers

(57) ABSTRACT

A gear mechanism is provided, having a gear arrangement, and a spindle arrangement to support the gear arrangement, the spindle arrangement having first, second, third and fourth spindles. The gear arrangement, of concentric gears only, that includes a first gear set mounted on the first and fourth spindles and arranged to be driven via a first pedal, a second gear set mounted on the second and fourth spindles and arranged to be driven via a second pedal, and a third gear set mounted on the third and fourth spindles, wherein, for each of the first and second gear sets, the gear set is configured to be alternately driven, via the corresponding pedal being rotated through less than 180°, in a power stroke to drive the third gear set, and, advanced, via the corresponding pedal being rotated through more than 180°, in a return stroke to commence a subsequent power stroke.

18 Claims, 9 Drawing Sheets

(51) Int. Cl.
*B62M 3/00* (2006.01)
*B62M 1/36* (2013.01)

(56) References Cited

U.S. PATENT DOCUMENTS 4,261,223 A * 4/1981 Johnson .................. B62M 1/36
 74/393
4,477,072 A * 10/1984 DeCloux .................. B62M 1/00
 482/4
5,983,751 A * 11/1999 DeCloux .................. B62M 1/36
 74/435

FOREIGN PATENT DOCUMENTS

| | | | | |
|---|---|---|---|---|
| CN | 104787225 A | * | 7/2015 | |
| CN | 105923100 A | * | 9/2016 | ............ B62M 11/02 |
| EP | 1225124 A1 | * | 7/2002 | ............ B62K 3/002 |
| FR | 468296 A | * | 7/1914 | |
| FR | 811578 A | * | 4/1937 | |
| JP | 2006347534 A | * | 12/2006 | |
| KR | 20030076502 A | * | 9/2003 | |
| WO | WO-9109766 A1 | * | 7/1991 | |
| WO | WO-2006060874 A1 | * | 6/2006 | ............. B62M 1/36 |
| WO | WO-2020251892 A1 | * | 12/2020 | ............. B62M 11/04 |

* cited by examiner

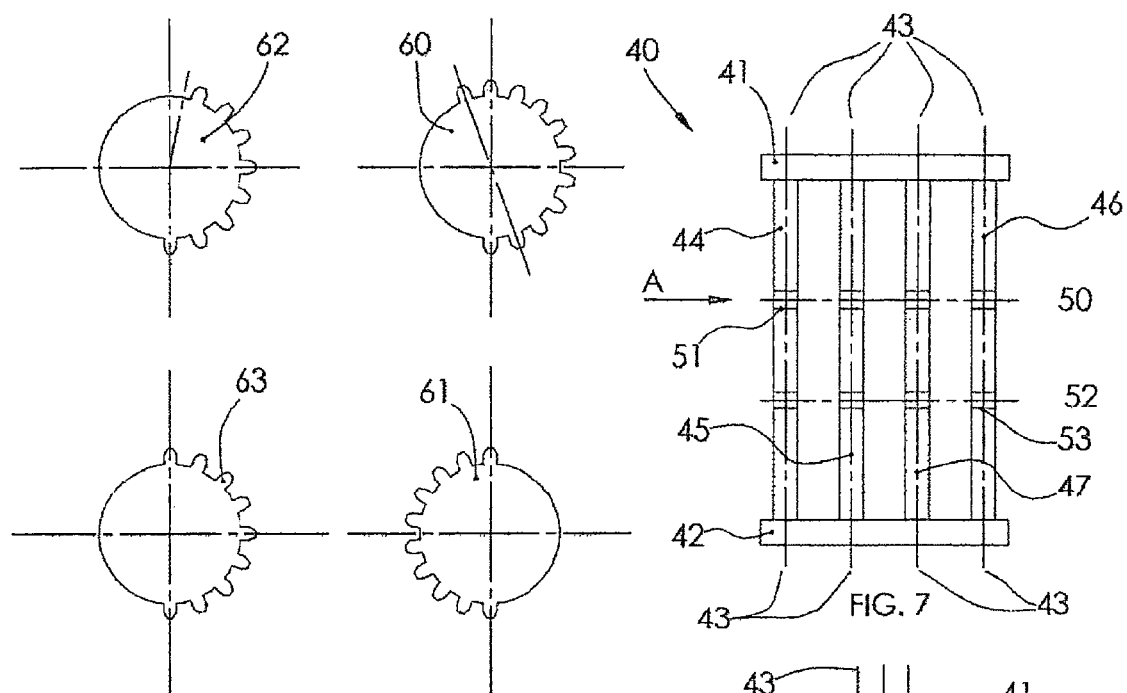
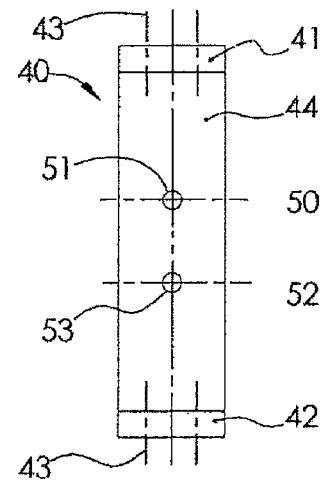
FIG. 7
View on direction A
FIG. 8
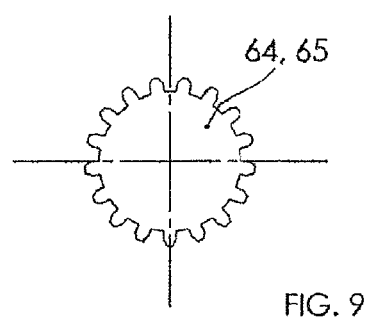
FIG. 9
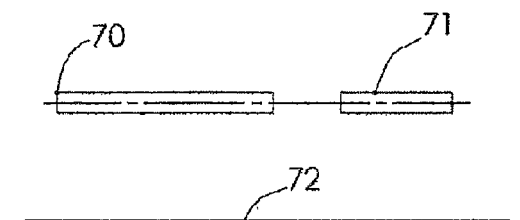
FIG. 10
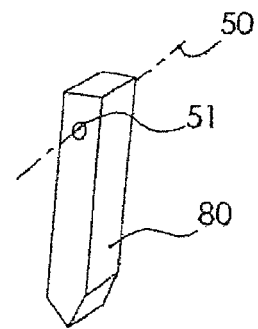
FIG. 11

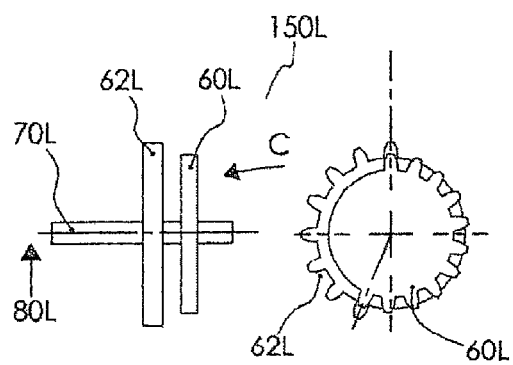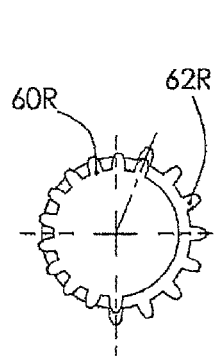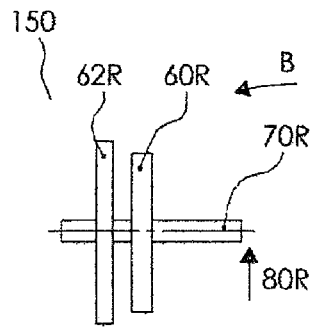
FIG. 14 — View in direction C FIG. 15 — View in direction B FIG. 13 — FIG. 12
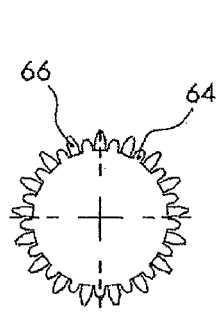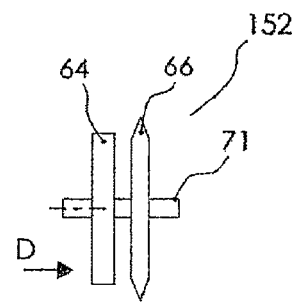
View in direction D FIG. 17 — FIG. 16
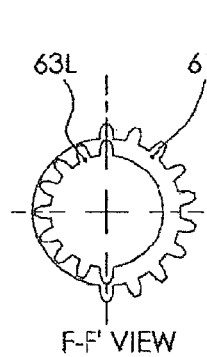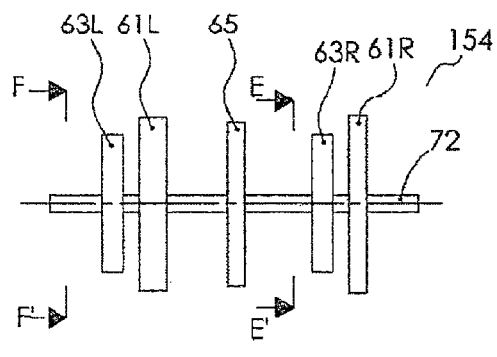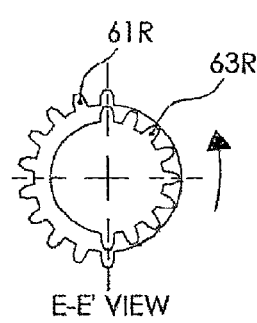
F-F' VIEW FIG. 20 — FIG. 18 — E-E' VIEW FIG. 19

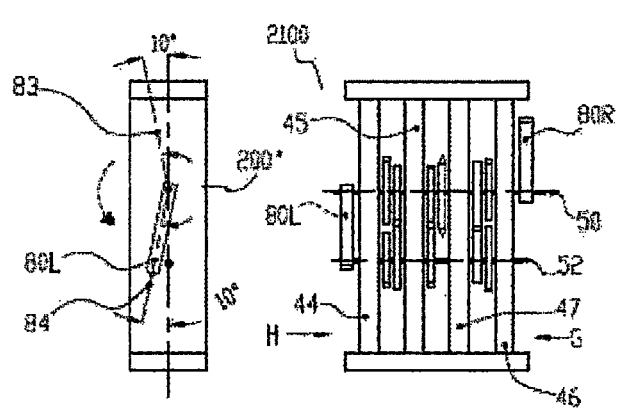
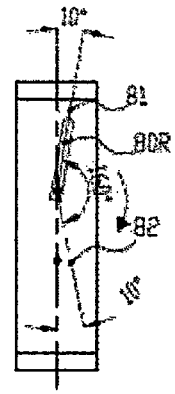
View in Direction H
FIG. 23
FIG. 21
View in Direction G
FIG. 22
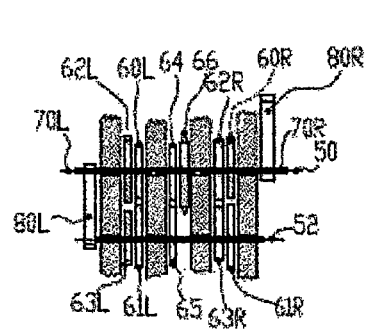
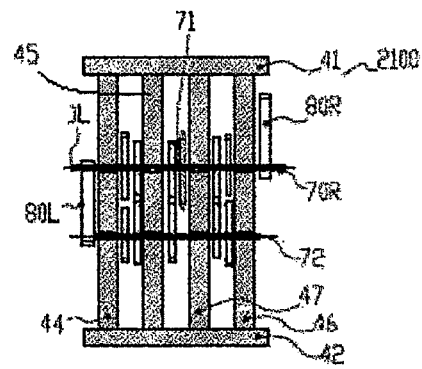
FIG. 25
FIG. 24
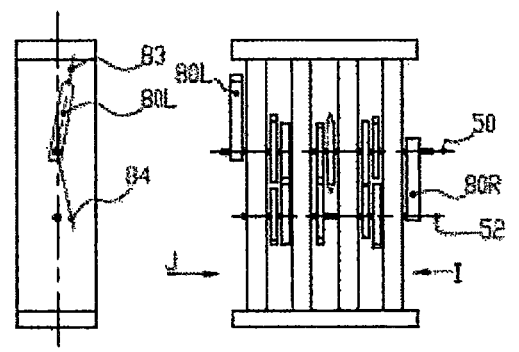
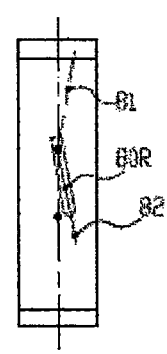
View in Direction J
FIG. 28
FIG. 26
View in Direction I
FIG. 27

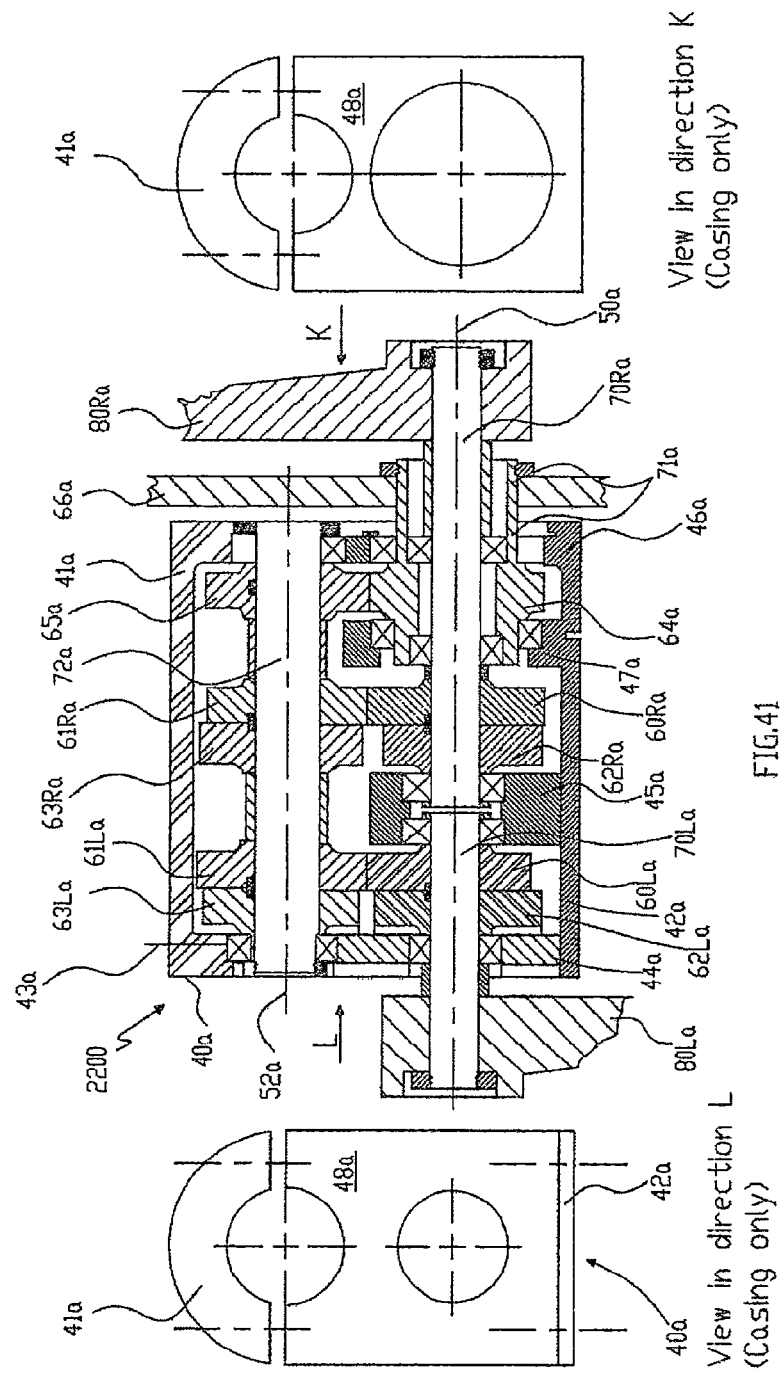

GEAR MECHANISM, PEDAL-POWERED VEHICLE COMPRISING THE SAME, AND METHOD FOR FORMING THE SAME

TECHNICAL FIELD

Various embodiments relate to a gear mechanism, a pedal-powered vehicle having the gear mechanism, and a method for forming the gear mechanism.

BACKGROUND

In the current art, bicycle pedals are mounted on an axle fitted to the bottom bracket of the frame of the bicycle. They are rigidly connected to the axle by crank arms that are fixed diametrically opposite to each other. The pedal at TDC (Top Dead Center) is the driver and the one at BDC (Bottom Dead Center) is the returning pedal. Driving power to the wheels is transmitted by the pedal starting at TDC and finishing at BDC.

FIG. 1 shows a schematic elevation view of an axle and pedals layout of prior art, while FIG. 2 shows a schematic end view for the layout of FIG. 1. There is an axle 20, with a right crank arm 21 and a right pedal 22 connected to one side of the axle 20, and a left crank arm 25 and a left pedal 26 connected to another side of the axle 20. The right crank arm 21 and the right pedal 22 are illustrated at the TDC 23 at the start of a power stroke, while the left crank arm 25 and the left pedal 26 are illustrated at the BDC 27 at the start of a return stroke.

Power is proportional to torque. Torque is defined as Force×Arm length. Force will be exerted by the cyclist and the "Arm" is determined by the crank arm length. The effective arm length, Arm, is a function of the angle of the crank arm relative to the axle centre and its variation is described by a sinusoidal curve for each revolution of 360°. Power transmitted is represented by the area under this curve.

The workings of the pedals 22, 26 of FIGS. 1 and 2 are now explained by analogy to a clock. In the present art, say, the right pedal 22 is at 12:00 (TDC 23), the left pedal 26 will be at 6:00 (BDC 27). The right pedal 22 will transmit power whilst going down from 12:00 to 6:00 (illustrated by solid arrow 28) for the first 180° of the revolution. Simultaneously, the left pedal 26 will be coming up from 6:00 to 12:00 (illustrated by dashed arrow 29). Then, the left pedal 26 will transmit power for the next 180° whilst going down from 12:00 to 6:00. The process repeats after each revolution of 360°. FIG. 3 shows the sinusoidal curves of the pedals per 360° revolution of the prior art. The X axis shows one revolution (360°) degrees of rotation, while the Y axis is the Arm length. Curve 35 is shown for the power stroke (region of 0° to) 180° and the return stroke (region of 180° to 360°) of one pedal (e.g., right pedal 22) and curve 36 is shown for the power stroke only of the other pedal (e.g., left pedal 26). As may be appreciated, the 360° revolution of FIG. 3 also refers to 360° of power strokes.

The length of the Arm is maximum at 3:00 and at 9:00, and is minimum or 0 at 12:00 and 6:00. Also, it is small for travel periods, say, from 12:00 (TDC 23) to 1:00 (position 31, FIG. 2), and 5:00 (position 32, FIG. 2) to 6:00 (BDC 27) with resultant low power transmission. These can be called "dead periods".

As there is minimal power transmission during the dead periods, there is therefore need to minimize the dead periods.

SUMMARY

The invention is defined in the independent claims. Further embodiments of the invention are defined in the dependent claims.

According to an embodiment, a gear mechanism for a pedal-powered vehicle is provided. The gear mechanism may include a gear arrangement, and a spindle arrangement configured to support the gear arrangement, the spindle arrangement having a first spindle, a second spindle, a third spindle and a fourth spindle, wherein the gear arrangement includes a first set of gears mounted on the first spindle and the fourth spindle, the first set of gears being arranged to be driven via a first pedal of the pedal-powered vehicle, a second set of gears mounted on the second spindle and the fourth spindle, the second set of gears being arranged to be driven via a second pedal of the pedal-powered vehicle, and a third set of gears mounted on the third spindle and the fourth spindle, wherein, for each of the first and second sets of gears, the set of gears is configured to be alternately driven, via the corresponding pedal being rotated through less than 180°, in a power stroke to drive the third set of gears for propelling the pedal-powered vehicle, and, advanced, via the corresponding pedal being rotated through more than 180°, in a return stroke to commence a subsequent power stroke.

According to an embodiment, a pedal-powered vehicle is provided. The pedal-powered vehicle may include a gear mechanism as described herein.

According to an embodiment, a method for forming a gear mechanism is provided. The method may include supporting a gear arrangement on a spindle arrangement, including mounting a first set of gears of the gear arrangement on a first spindle of the spindle arrangement and a fourth spindle of the spindle arrangement, the first set of gears being arranged to be driven via a first pedal of the pedal-powered vehicle, mounting a second set of gears of the gear arrangement on a second spindle of the spindle arrangement and the fourth spindle, the second set of gears being arranged to be driven via a second pedal of the pedal-powered vehicle, and mounting a third set of gears of the gear arrangement on a third spindle of the spindle arrangement and the fourth spindle, wherein, for each of the first and second sets of gears, the set of gears is configured to be alternately driven, via the corresponding pedal being rotated through less than 180°, in a power stroke to drive the third set of gears for propelling the pedal-powered vehicle, and, advanced, via the corresponding pedal being rotated through more than 180°, in a return stroke to commence a subsequent power stroke.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 7 shows a schematic front view of a support structure of a gear mechanism, while FIG. 8 shows a schematic end view of the support structure in the direction A indicated in FIG. 7.

FIG. 9 shows schematic views of individual gears of the gear mechanism.

FIG. 10 shows schematic views of spindles of the gear mechanism.

FIG. 11 shows a schematic illustration of a pointer to represent a crank arm and an associated pedal.

FIGS. 12 to 20 show schematic views illustrating arrangements of the gears of the gear mechanism.

FIGS. 21 to 28 show schematic views of the gear mechanism.

FIG. 41 shows schematic views of the gear mechanism, while

DETAILED DESCRIPTION

Figure 2:
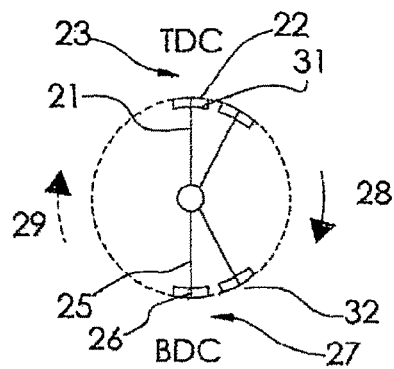
FIG. 2 shows a schematic end view of orientation of the pedals relative to the axle for the layout of FIG. 1.
Figure 1:
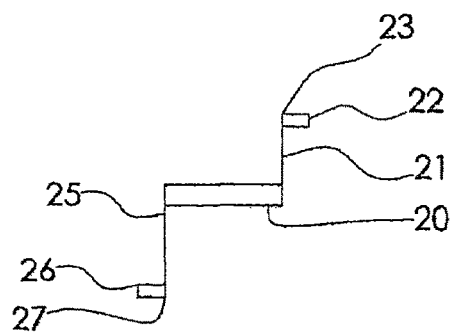
FIG. 1 shows a schematic elevation view of an axle and pedals layout of prior art.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

As described, there are dead periods when very little or no power is transmitted to the bicycle wheels. These are at or near the TDC (Top Dead Centre) and the BDC (Bottom Dead Centre) of the driving pedal. This arises when the power and return pedals are fixed diametrically opposite to each other at 180°, as provided in known systems. Various embodiments provide a means or technique to minimise or remove the dead periods by starting the power stroke after the TDC and finishing the power stroke before the BDC. This may enable more power strokes, thus, more power transmitted compared with 360° revolution of powered strokes of the current art.

Various embodiments may provide an arrangement of/for bicycle pedals which has means to subdivide the driving, and the return strokes in unequal proportions for each 180° or its multiples of it of an axle rotation to minimise the dead periods during the power stroke by using a smaller but more effective part of 180° of a sinusoidal curve of the aforementioned unequal proportion which is traversed in a shorter time whilst the opposing pedal is advanced by the larger of the unequal aforementioned proportion to return it to the next driving position in the same shorter time thus giving more power for each revolution of 360° of power strokes when compared with the current art. There may be provided one or more mechanical, hydraulic, electrical, electronics components or any combination thereof mounted on single or multiple axes to eliminate the dead periods, at and near the top and bottom dead centres of the pedals, when no or very little power is transmitted to the driving wheel. There may be two defined axes. Multiple spindles may be used on an axis or on one of the axes. Gears with teeth only partway round their circumferences may be employed. The pedal arrangement may be tailored to suit an individual rider.

Various embodiments may relate to a gear mechanism or a pedal advancer. The gear mechanism may reduce the dead periods associated with known bicycle pedalling mechanisms. Using analogy to a clock, for the gear mechanism, the power stroke may start after 12:00 (TDC), for example, from 1:00 (see position 31, FIG. 2) and finishes before 6:00, for example, at 5:00 (see position 32, FIG. 2). So, whilst one pedal (e.g., right pedal) is going down, for example, from 1:00 to 5:00 (less than 180°), the other pedal (e.g., left pedal) is advancing, for example, from 5:00 to 1:00 (more than 180°). In other words, referring to FIG. 2 as a non-limiting example, the start of the power stroke of the pedal advancer may be at position 31 and its end may be at position 32.

The extra power transmitted by the gear mechanism of various embodiments will be illustrated by way of the following non-limiting examples.

Figure 4:
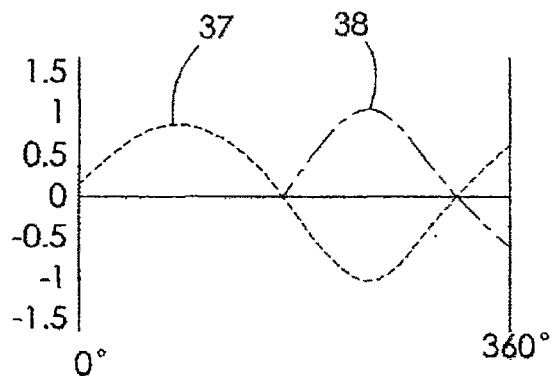
FIG. 4 shows the sinusoidal curves for the pedals according to various embodiments, for 360° of power strokes.

FIG. 4 shows the sinusoidal curves for the pedals (or pedal system) according to various embodiments, for 360° of power strokes. The X axis shows 360° of power strokes, while the Y axis is the Arm length. Curve 37 is shown for the power stroke of one pedal (e.g., right pedal), and curve 39 is shown for part of the next power stroke of the same pedal. Curve 38 is shown for the power stroke of the other pedal (e.g., left pedal).

Figure 3:
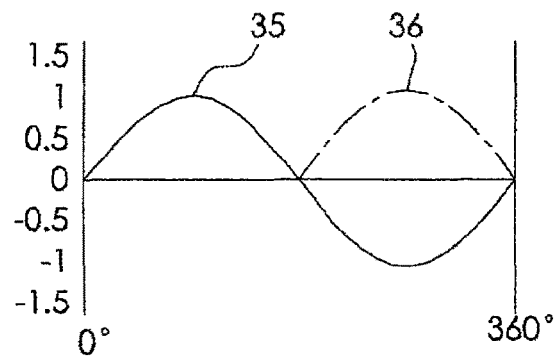
FIG. 3 shows the sinusoidal curves of the pedals per 360° revolution of prior art.
Figure 5:
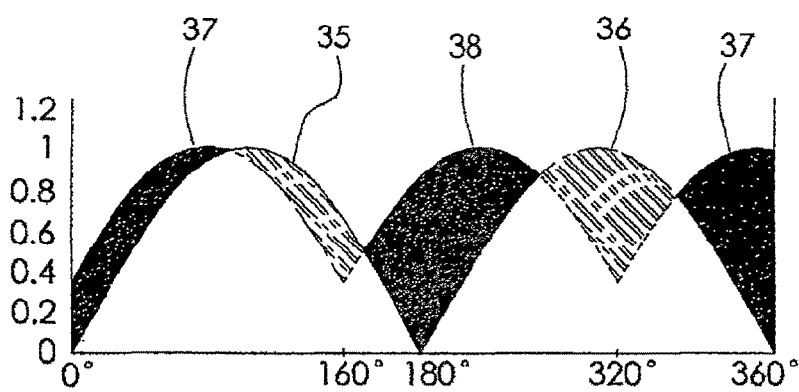
FIG. 5 shows the power curves of FIGS. 3 and 4 superimposed per 360° of power strokes.

FIG. 5 shows the power curves of FIGS. 3 and 4 superimposed per 360° of power strokes. The X axis shows 360° of power strokes, while the Y axis is the Arm length. Curves 35, 36, 37, 38 and 39 are for the power strokes only. The shaded areas bounded by the curves 35, 36, 37, 38 and 39 indicate the power gained by the gear mechanism of various embodiments and the hatched areas indicate the power lost. The difference between the shaded and hatched areas is the net power gained per 360° of power strokes. Overall, as shown, for each 360° of power strokes, more power is transmitted with the arrangement (i.e., gear mechanism) according to various embodiments compared to the existing art.

Various embodiments may provide a gear mechanism (or pedal advancer) suitable for use with pedals, e.g. bicycle pedals. The gear mechanism aims to minimize the dead periods, by enabling a first pedal to travel x° (where x°<180°) for the power stroke, and, at the same time, the opposing (second) pedal to travel y° (where y°>180°, e.g., y°=360°−x°) for the return stroke to be ready to commence its power stroke subsequently. Next, the second pedal travels x° for its power stroke while, at the same time, the first pedal travels y° for its return stroke. The sequence then repeats. As a result, more power may be transmitted over the same instance of 360° of power strokes compared to the current art. The power stroke may start after the TDC (e.g., 10° after TDC going in clockwise direction) and ends before the BDC (e.g., 10° before BDC), while the return stroke (using the same example) may start before the BDC (e.g., 10° before BDC) and ends after the TDC (e.g., 10° after TDC). In this instance, as a non-limiting example, each power stroke may cover rotation over or of 160° while each return stroke may cover rotation over or of 200°.

Figure 6A:
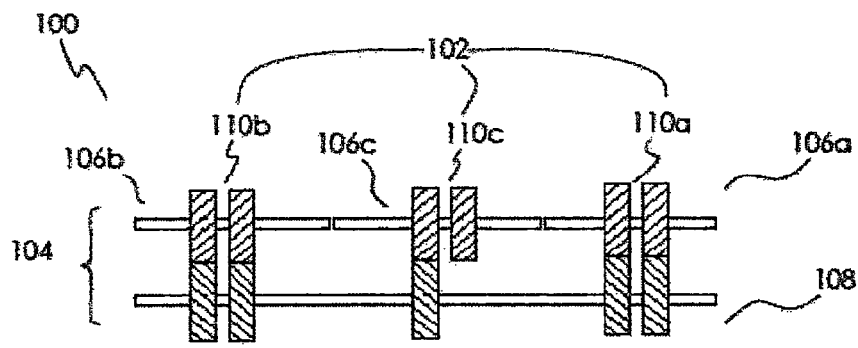
FIG. 6A shows a schematic view of a gear mechanism for a pedal-powered vehicle, according to various embodiments.

FIG. 6A shows a schematic view of a gear mechanism 100 for a pedal-powered vehicle, according to various embodiments. The gear mechanism 100 includes a gear arrangement 102, and a spindle arrangement 104 configured to support the gear arrangement 102, the spindle arrangement 104 having a first spindle 106a, a second spindle 106b, a third spindle 106c and a fourth spindle 108, wherein the gear arrangement 102 includes a first set of gears (collectively illustrated as hatched box 110a) mounted on the first spindle 106a and the fourth spindle 108, the first set of gears 110a being arranged to be driven via a first pedal of the pedal-powered vehicle, a second set of gears (collectively illustrated as hatched box 110b) mounted on the second spindle 106b and the fourth spindle 108, the second set of gears 110b being arranged to be driven via a second pedal of the pedal-powered vehicle, and a third set of gears (collectively illustrated as hatched box 110c) mounted on the third spindle 106c and the fourth spindle 108, wherein, for each of the first and second sets of gears 110a, 110b, the set of gears is configured to be alternately driven, via the corresponding pedal being rotated through less than 180°, in a power stroke to drive the third set of gears 110c for propelling the pedal-powered vehicle, and, advanced, via the corresponding pedal being rotated through more than 180°, in a return stroke to commence a subsequent power stroke.

In other words, a gear mechanism 100 may be provided, which may be suitable for assembly or mounting onto a pedal-powered vehicle for propelling the pedal-powered vehicle. The gear mechanism 100 may include a spindle arrangement 104 and a gear arrangement 102 attached or mounted on the spindle arrangement 104. The gear arrangement 102 may include a plurality of gears arranged into a first set of gears 110a, a second set of gears 110b, and a third set of gears 110c. The first, second and third sets of gears 110a, 110b, 110c may be distinct and separate from each other, and adapted to perform their corresponding respective functions. This may mean that a gear belonging to or forming part of one of the first, second and third sets of gears 110a, 110b, 110c may not necessarily form part of any one of the other of the first, second and third sets of gears 110a, 110b, 110c. Each of the first, second and third sets of gears 110a, 110b, 110c may include one or more circular gears. The spindle arrangement 104 may include four independent or distinct spindles 106a, 106b, 106c, 108, for mounting of the gears. The fourth spindle 108 may be arranged spaced apart from the first, second and third spindles 106a, 106b, 106c.

Part of the first set of gears 110a may be mounted on the first spindle 106a and another part of the first set of gears 110a may be mounted on the fourth spindle 108. Part of the second set of gears 110b may be mounted on the second spindle 106b and another part of the second set of gears 110b may be mounted on the fourth spindle 108. Part of the third set of gears 110c may be mounted on the third spindle 106c and another part of the third set of gears 110c may be mounted on the fourth spindle 108. As described, a single fourth spindle 108 may support respective parts of the first, second and third sets of gears 110a, 110b, 110c. The fourth spindle 108 and the gears mounted thereon may be rotated together in sync with each other.

The four spindles 106a, 106b, 106c, 108 may be arranged independently of each other, meaning that the spindles 106a, 106b, 106c, 108 may not be directly connected to each other. However, it should be appreciated that the spindles (and their functions) may be interlinked to each other via the functioning or operation of the first, second and third sets of gears 110a, 110b, 110c.

The first set of gears 110a may be driven via a first pedal (e.g., right pedal) of the pedal-powered vehicle, while the second set of gears 110b may be driven via a second (opposing) pedal (e.g., left pedal) of the pedal-powered vehicle. As non-limiting examples, when assembled on the pedal-powered vehicle, the first pedal may be connected to the gear mechanism 100 by means of a first crank arm connected to the first pedal and the first spindle 106a, and the second pedal may be connected to the gear mechanism 100 by means of a second crank arm connected to the second pedal and the second spindle 106b.

Each of the first and second sets of gears 110a, 110b may be driven via the corresponding pedal travelling through (or for) an arc of less than 180° (i.e., x°<180°) in the corresponding power stroke to drive the third set of gears 110c for propelling the pedal-powered vehicle, and advanced via the corresponding pedal travelling through (or for) an arc of more than 180° (i.e., y°>180°, e.g., y°=360°−x°) in the corresponding return stroke to commence a subsequent power stroke, alternately. In other words, each of the first and second sets of gears 110a, 110b may be operable through a plurality of cycles for propelling the pedal-powered vehicle, where each cycle includes a power stroke and a return stroke, with the corresponding pedal undergoing a rotation of 360° per pedal cycle. In various embodiments, the (duration of the) power stroke may be limited or restricted to the distance of an arc of less than 180° travelled by the corresponding pedal.

In operation, at any one time, one of the first and second sets of gears 110a, 110b is in the power stroke, and the other of the first and second sets of gears 110a, 110b is in the return stroke. Therefore, at any one time, the first and second sets of gears 110a, 110b are configured to be driven in different strokes of the power stroke and the return stroke, meaning that when one set of gears is driven in the power stroke, the other set of gears is advanced in the return stroke. Further, it should be appreciated that the third set of gears 110c is driven alternately by the first and second sets of gears 110a, 110b in the corresponding respective power stroke.

Driving of the first set of gears 110a (or the second set of gears 110b) in the corresponding power stroke is accompanied by rotation of the first spindle 106a (or the second spindle 106b) supporting the first set of gears 110a (or the second set of gears 110b), as well as rotation of the second spindle 106b (or the first spindle 106a) supporting the second set of gears 110b (or the first set of gears 110a) in the corresponding return stroke.

In the corresponding respective power stroke, driving of the first set of gears 110a and the second set of gears 110b causes rotation of the fourth spindle 108 to drive rotation of the third spindle 106c and the third set of gears 110c for driving a chain wheel of the pedal-powered vehicle for propelling the pedal-powered vehicle.

In various embodiments, the first spindle 106a, the second spindle 106b and the third spindle 106c may be arranged along (or aligned with) a first (common) axis, and the fourth spindle 108 may be arranged along (or aligned with) a second axis. Respective longitudinal axes of the first spindle 106a, the second spindle 106b and the third spindle 106c may be aligned with or parallel to the first axis. The first and second axes are different axes. The first and second axes may be parallel axes. One of the first and second axes may be an upper axis, while the other of the first and second axes may be a lower axis.

The first spindle 106a, the second spindle 106b and the third spindle 106c may be arranged side-by-side as illustrated in FIG. 6A. The third spindle 106c may be sandwiched between the first and second spindles 106a, 106b. The first spindle 106a, the second spindle 106b and the third spindle 106c may be arranged in line with one another.

One of the first spindle 106a and the third spindle 106c may be arranged rotatable about the other of the first spindle 106a and the third spindle 106c. For example, the first and third spindles 106a, 106c may be coaxial spindles. One of the first and third spindles 106a, 106c may be arranged surrounding at least part of the other of the first and third spindles 106a, 106c.

The third spindle 106c may be adapted to be arranged independently of crank arms of the pedal-powered vehicle. This may mean that the third spindle 106c may not be mechanically connected to crank arms of the pedal-powered vehicle. Further, the third spindle 106c may not be mechanically connected to each of the first and second pedals of the pedal-powered vehicle.

In various embodiments, each of the first, second and third sets of gears 110a, 110b, 110c may include one or more pairs of gears, where gears of each pair may engage or mesh with one another.

The first set of gears 110a may include a first pair of partial gears including a first partial gear mounted on the first spindle 106a and a second partial gear mounted on the fourth spindle 108, wherein the first and second partial gears may be arranged to engage (or mesh with) each other in the power stroke associated with the first set of gears 110a, and a second pair of partial gears including a third partial gear mounted on the first spindle 106a and a fourth partial gear mounted on the fourth spindle 108, wherein the third and fourth partial gears may be arranged to engage (or mesh with) each other in the return stroke associated with the first set of gears 110a. Each of the first, second, third and fourth partial gears may include or may be a circular gear. In the context of various embodiments, a partial gear may mean a gear having a plurality of teeth or cogs along (only) a part or section of the perimeter or circumference of the gear. This may mean that there may be another part of the perimeter of the partial gear without teeth. For example, teeth may be provided over a circular segment of a circular partial gear, with the remaining circular segment of the circular partial gear being without teeth.

The second set of gears 110b may include a first pair of partial gears including a first partial gear mounted on the second spindle 106b and a second partial gear mounted on the fourth spindle 108, wherein the first and second partial gears may be arranged to engage (or mesh with) each other in the power stroke associated with the second set of gears 110b, and a second pair of partial gears including a third partial gear mounted on the second spindle 106b and a fourth partial gear mounted on the fourth spindle 108, wherein the third and fourth partial gears may be arranged to engage (or mesh with) each other in the return stroke associated with the second set of gears 110b. Each of the first, second, third and fourth partial gears may include or may be a circular gear.

For each of the first set of gears 110a and the second set of gears 110b, the first and second partial gears may be referred to as the power stroke (partial) gears, while the third and fourth partial gears may be referred to as the return stroke (partial) gears. The first and second partial gears may be disengaged from each other in the return stroke associated with the corresponding set of gears. The third and fourth partial gears may be disengaged from each other in the power stroke associated with the corresponding set of gears.

As non-limiting examples, for the first set of gears 110a, the first partial gear (and the first spindle 106a) may be driven through (or for) less than 180° (i.e., <180°) in the power stroke, with the first partial gear engaging with the second partial gear, where the second partial gear (and the fourth spindle 108) may be rotated through (or for) 180° (i.e., =180°). The third partial gear (and the first spindle 106a) may be driven through (or for) more than 180° (i.e., >180°) in the return stroke, with the third partial gear engaging with the fourth partial gear, where the fourth partial gear (and the fourth spindle 108) may be rotated through (or for) 180°.

As non-limiting examples, for the second set of gears 110b, the first partial gear (and the second spindle 106b) may be driven through (or for) less than 180° (i.e., <180°) in the power stroke, with the first partial gear engaging with the second partial gear, where the second partial gear (and the fourth spindle 108) may be rotated through (or for) 180° (i.e., =180°). The third partial gear (and the second spindle 106b) may be driven through (or for) more than 180° (i.e., >180°) in the return stroke, with the third partial gear engaging with the fourth partial gear, where the fourth partial gear (and the fourth spindle 108) may be rotated through 180°.

The third set of gears 110c may include a first full gear mounted on the third spindle 106c and a second full gear mounted on the fourth spindle 108, wherein the first and second full gears 110a, 110b may be arranged to engage (or mesh with) each other (in the power strokes associated with the first and second sets of gears 110a, 110b) for propelling the pedal-powered vehicle. Each of the first and second full gears may include or may be a circular gear. In the context of various embodiments, a full gear may mean a gear having a plurality of teeth or cogs along the entire perimeter or circumference of the gear. This may mean that a full gear has teeth over 360° of its perimeter or circumference.

The first and second full gears may be arranged to engage (or mesh with) each other for driving the chain wheel of the pedal-powered vehicle. The first and second full gears may be driven alternately by the first and second sets of gears 110a, 110b in the respective power stroke. Each of the first and second full gears may be driven though the same amount of angular or rotational movement (e.g.,180°) per power stroke. This in turn may drive the chain wheel through the same amount of angular movement.

As described, it should be appreciated that the fourth spindle 108 may have mounted thereon both partial and full gears.

In various embodiments, one or more or all of the gears described herein may be circular gears. Each of the first, second and third sets of gears 110*a*, 110*b*, 110*c* may include a plurality of circular gears. All gears of any one or each of the first, second and third sets of gears 110*a*, 110*b*, 110*c* may be circular gears.

In various embodiments, for each of the first and second sets of gears 110*a*, 110*b*, the set of gears may be configured to be alternately driven in the power stroke via the corresponding pedal being rotated through (or for) 160°, and advanced in the return stroke via the corresponding pedal being rotated through (or for) 200°.

In various embodiments, for each of the first and second sets of gears 110*a*, 110*b*, the set of gears may be configured to be driven in the power stroke to drive the third set of gears 110*c* to rotate the third spindle 106*c* through (or for) 180°. In some other embodiments, it should be appreciated that the third spindle 106*c* may be rotated through (or for) less than 180° (i.e., <180°), or more than 180° (i.e., >180°).

The gear mechanism 100 may further include a chain wheel mounted on the third spindle 106*c*. Driving of the third set of gears 110*c* in the power stroke drives rotation of the chain wheel for propelling the pedal-powered vehicle. As may be appreciated, a chain may be mounted on the chain wheel and linking to a sprocket associated with a wheel of the pedal-powered vehicle for driving the wheel to propel the pedal-powered vehicle. The chain wheel may be driven though the same amount of angular or rotational movement (e.g.,180°) in each power stroke. As a result, there may be uniform or constant chain wheel speed at all times (i.e., consistent rotation speed of the chain wheel), with a constant output speed for the wheels of the pedal-powered vehicle at all times.

In various embodiments, for each of the first and second sets of gears 110*a*, 110*b*, the set of gears may be configured, in the power stroke, to drive the third set of gears 110*c* for propelling the pedal-powered vehicle at a constant wheel speed. This may mean that the wheels of the pedal-powered vehicle may be rotated at a constant wheel speed throughout each or both of the power strokes associated with the first and second sets of gears 110*a*, 110*b*. This may also mean that the chainwheel of the pedal-powered vehicle may be rotated at a constant speed. The spindle to which the chainwheel is mounted may be rotated at a constant speed to allow propelling the pedal-powered vehicle at a constant wheel speed.

The gear mechanism 100 may further include a support structure to support the gear arrangement 102 and the spindle arrangement 104.

Figure 6B:
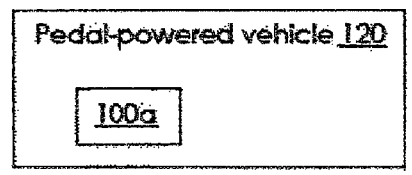
FIG. 6B shows a schematic block diagram illustrating a pedal-powered vehicle, according to various embodiments.

FIG. 6B shows a schematic block diagram illustrating a pedal-powered vehicle 120, according to various embodiments. The pedal-powered vehicle 120 includes a gear mechanism 100*a* which may be as described in the context of the gear mechanism 100. The gear mechanism 100*a* may be mounted or attached to a frame or support structure of the pedal-powered vehicle 120.

The pedal-powered vehicle 120 may include a first pedal, and a first crank arm coupling the first pedal to the first spindle (e.g., 106*a*, FIG. 6A), and a second pedal, and a second crank arm coupling the second pedal to the second spindle (e.g., 106*b*, FIG. 6A). In other words, the first pedal may be connected to the first crank arm, which in turn may be connected to the first spindle. Similarly, the second pedal may be connected to the second crank arm, which in turn may be connected to the second spindle.

In various embodiments, the third spindle (e.g., 106*c*, FIG. 6A) may be arranged independently of the first and second crank arms. In other words, the third spindle may not be mechanically connected to each of the first and second crank arms. Further, the third spindle may not be mechanically connected to each of the first and second pedals.

The pedal-powered vehicle 120 may include or may be a bicycle.

Figure 6C:
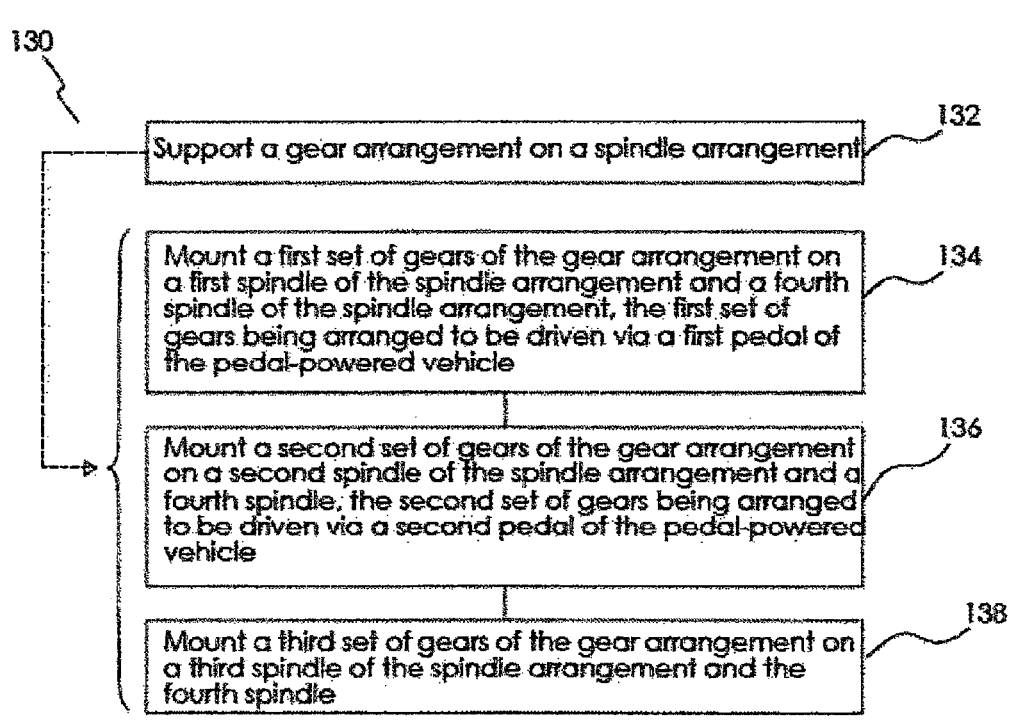
FIG. 6C shows a flow chart illustrating a method for forming a gear mechanism for a pedal-powered vehicle, according to various embodiments.

FIG. 6C shows a flow chart 130 illustrating a method for forming a gear mechanism for a pedal-powered vehicle, according to various embodiments.

At 132, a gear arrangement may be supported on a spindle arrangement, which may include the following.

At 134, a first set of gears of the gear arrangement is mounted on a first spindle of the spindle arrangement and a fourth spindle of the spindle arrangement, the first set of gears being arranged to be driven via a first pedal of the pedal-powered vehicle.

At 136, a second set of gears of the gear arrangement is mounted on a second spindle of the spindle arrangement and the fourth spindle, the second set of gears being arranged to be driven via a second pedal of the pedal-powered vehicle.

At 138, a third set of gears of the gear arrangement is mounted on a third spindle of the spindle arrangement and the fourth spindle.

For each of the first and second sets of gears, the set of gears is configured to be alternately driven, via the corresponding pedal being rotated through less than 180°, in a power stroke to drive the third set of gears for propelling the pedal-powered vehicle, and, advanced, via the corresponding pedal being rotated through more than 180°, in a return stroke to commence a subsequent power stroke.

The first spindle, the second spindle, the third spindle and the fourth spindle may be arranged independently of each other, meaning that the spindles may not be directly connected to each other.

It should be appreciated that descriptions in the context of the gear mechanism 100 may correspondingly be applicable in relation to the method for forming a gear mechanism described in the context of the flow chart 130.

The gear mechanism of various embodiments will now be described in further detail using non-limiting examples of models that have been built in-house. FIGS. 7 to 10 show different parts that may be used to make up the gear mechanism.

FIG. 7 shows a schematic front view of a support structure or housing 40 of a gear mechanism, while FIG. 8 shows a schematic end view of the support structure 40 in the direction A indicated in FIG. 7. The support structure 40 may include an upper or top member 41, a lower or bottom member 42, and four vertical or upright members 44, 45, 46, 47 that may be fixed together by screws 43. Two parallel axes 50, 52 may be defined in or for the support structure 40. There may be provided openings or holes 51 aligned on or with the axis 50 through each of the upright members 44, 45, 46, 47, and openings or holes 53 aligned on or with the axis 52 through each of the upright members 44, 45, 46, 47.

FIG. 9 shows schematic views of individual gears (or gear elements) of the gear mechanism. Gears that may be used may include gears having teeth only on parts of the circumference, which are referred to as partial gears, and, gears with teeth all around the circumference, which are referred to as full gears.

Two sets of gears for the pedal power stroke and the pedal advancer (or return) stroke are used, one set each for the right and left sides. In other words, one set of gears for the power and return strokes may be associated with a right pedal, while another set of gears for the power and return strokes may be associated with a left pedal.

For the pedal power stroke, the associated gears may include partial gear 62 as the driver (or driver gear) and partial gear 63 as the driven gear. In other words, the partial gears 62, 63 may engage or mesh with each other during the power stroke, meaning that the partial gears 62, 63 may be power stroke gears. Two pairs of partial gears 62, 63 may be provided, one pair being associated with the right pedal for operation during the power stroke of the right pedal, with the other pair being associated with the left pedal for operation during the power stroke of the left pedal. As non-limiting examples, the partial gear 62 may have teeth over less than 180° of the circumference, and the partial gear 63 may have teeth over 180° of the circumference.

For the pedal return or advancer stroke, the associated gears may include partial gear 61 as the driver (or driver gear) and partial gear 60 as the driven gear. In other words, the partial gears 61, 60 may engage or mesh with each other during the return stroke, meaning that the partial gears 61, 60 may be return stroke gears. Two pairs of partial gears 61, 60 may be provided, one pair being associated with the right pedal for operation during the return stroke of the right pedal, with the other pair being associated with the left pedal for operation during the return stroke of the left pedal. As non-limiting examples, the partial gear 60 may have teeth over more than 180° of the circumference, and the partial gear 61 may have teeth over 180° of the circumference.

The associated gears for wheel drive are full gears 64, 65 as the driver and driven gears, with teeth over 360° of the circumference.

The various partial gears 60, 61, 62, 63 may have different number of teeth. The partial gears 60, 61, 62, 63 of both pedals co-operate with the full gears 64, 65 for driving the wheels of a pedal-powered vehicle (e.g., bicycle). In doing so, the full gears 64, 65 co-operate with each other and may drive a chain wheel to drive the wheels.

FIG. 10 shows schematic views of spindles (or axles) of the gear mechanism. There may be three spindles provided aligned with the axis 50, in the form of a central spindle 71, and sandwiched by two spindles 70 (only one such spindle 70 is shown in FIG. 10). The spindle 71 may be employed for gear and chain wheel drive for the wheel of a pedal-powered vehicle (e.g., bicycle). The two spindles 70 may be used to attach the corresponding crank arms (and the associated pedals), one each for the right side and the left side. One (single) spindle 72 may be provided aligned with the axis 52. Based on the positions of the axes 50, 52 in the upright orientation of the support structure 40 illustrated in FIG. 7, the spindles 70, 71 may be upper spindles, and the spindle 72 may be a lower spindle.

FIG. 11 shows a schematic illustration of a pointer 80 to represent a crank arm and an associated pedal. It should be appreciated that there would be two pointers employed with the gear mechanism, one each for the right side and the left side. An opening or hole 51a may be defined in the pointer 80, which may be aligned with the axis 50 and may engage with a corresponding spindle 71.

In the following description, the gears and spindles for the right side (i.e., associated with the right crank arm/pedal) are indicated by their respective reference numbers followed by the letter "R" at the end, and, those for the left side (i.e., associated with the left crank arm/pedal) are indicated with the letter "L" at the end.

FIGS. 12 to 20 show schematic views illustrating arrangements of the gears of the gear mechanism. FIG. 12 shows a schematic view of an assembly 150R of right side partial gears 62R, 60R on their corresponding spindle 70R, illustrating the axial position of the partial gears 62R, 60R on the spindle 70R. A pointer 80R may be attached to the longer end of the spindle 70R. FIG. 13 shows a schematic end view of the arrangement 150R in the direction B indicated in FIG. 12, illustrating the orientation of the partial gears 60R, 62R relative to each other. FIG. 14 shows a schematic view of an assembly 150L of left side partial gears 62L, 60L on their corresponding spindle 70L, illustrating the axial position of the partial gears 62L, 60L on the spindle 70L. A pointer 80L may be attached to the longer end of the spindle 70L. FIG. 15 shows a schematic end view of the arrangement 150L in the direction C indicated in FIG. 14, illustrating the orientation of the partial gears 60L, 62L relative to each other. FIG. 16 shows a schematic view of an arrangement 152 of a full gear 64 and a chain sprocket 66 for driving the wheel of a pedal-powered vehicle, illustrating the full gear 64 and the chain wheel 66 being mounted or fixed on or to a corresponding spindle 71. FIG. 17 shows a schematic end view of the arrangement 152 in the direction D indicated in FIG. 16.

FIG. 18 shows a schematic view of an assembly 154 of gears 61R, 63R, 65, 61L, 63L on (lower) spindle 72, illustrating the arrangement of gears 61R, 63R, 65, 61L, 63L axially on the spindle 72. FIG. 19 shows the arrangement 154 when viewed at E-E', showing the relative orientation of the partial gears 61R, 63R, while FIG. 20 shows the arrangement 154 when viewed at F-F', showing the relative orientation of the partial gears 61L, 63L.

The positioning of the arrangements 150R, 150L, 152, 154 relative to each other in the gear mechanism will be described further below.

FIGS. 21 to 28 show schematic views of the gear mechanism of various embodiments. FIG. 21 shows a schematic front view of the gear mechanism (or pedal advancer) 2100, as assembled using the arrangements 150R, 150L, 152, 154, described above with reference to FIGS. 12 to 20. FIG. 24 shows a schematic cross-sectional view of the gear mechanism 2100, cut through the axes 50, 52 and their respective spindles 70R, 71, 70L, 72. FIG. 25 shows a view of part of the gear mechanism 2100 shown in FIG. 24, for clarity purposes and ease of identification of the various gears 60R, 62R, 64, 60L, 62L, 61R, 63R, 65, 61L, 63L.

The arrangements 150R, 150L, 152, 154 illustrated in FIGS. 12 to 20 may be assembled as illustrated in FIGS. 21, 24, and 25. The partial gears 60R, 61R may be aligned coaxially (vertically) with each other where the partial gears 60R, 61R may engage or mesh with each other during the return stroke associated with the right pedal (or pointer 80R). The partial gears 60R, 61R may be disengaged from each other during the power stroke associated with the pointer 80R.

The partial gears 62R, 63R may be aligned coaxially (vertically) with each other where the partial gears 62R, 63R may engage or mesh with each other during the power stroke associated with the right pedal (or pointer 80R). The partial gears 62R, 63R may be disengaged from each other during the return stroke associated with the pointer 80R.

The partial gears 60L, 61L may be aligned coaxially (vertically) with each other where the partial gears 60L, 61L may engage or mesh with each other during the return stroke associated with the left pedal (or pointer 80L). The partial gears 60L, 61L may be disengaged from each other during the power stroke associated with the pointer 80L.

The partial gears 62L, 63L may be aligned coaxially (vertically) with each other where the partial gears 62L, 63L may engage or mesh with each other during the power stroke associated with the left pedal (or pointer 80L). The partial gears 62L, 63L may be disengaged from each other during the return stroke associated with the pointer 80L.

The full gears 64, 65 may be aligned coaxially (vertically) with each other where the full gears 64, 65 may engage or mesh with each other to drive the chain wheel 66 for propelling the pedal-powered vehicle (e.g., bicycle). The full gears 64, 65 may be engaged with each other during respective power strokes associated with the pointers 80R, 80L.

As shown, the spindles 70R, 71, 70L may be arranged side-by-side relative to each other, and in line with one another, with the spindle 71 being the central spindle. The spindles 70R, 71, 70L may be arranged on or aligned with the axis 50. The spindles 70R, 71, 70L may be independent of each other and not directly connected to each other. The spindle 70R may be mounted through the openings 51 (see FIGS, 7, 8) of the upright members 46, 47, the spindle 71 may be mounted through the openings 51 of the upright members 45, 47, and the spindle 70L may be mounted through the openings 51 of the upright members 44, 45. The spindle 72 may be arranged spaced apart from the spindles 70R, 71, 70L and may be arranged on or aligned with the axis 52. The spindle 72 may be mounted through the openings 53 (see FIGS, 7, 8) of the upright members 44, 45, 46, 47.

FIG. 22 shows a schematic end view of the gear mechanism 2100 in the direction G indicated in FIG. 21, with the right pointer 80R (associated with the right pedal) illustrated at a position at the start of the power stroke. The dashed arrow shows the direction of travel of the pointer 80R rotating clockwise. The pointer 80R may be aligned with the marker line 81, which represents the start of the pedal power (or driver) stroke. As a non-limiting example, the marker line 81 may be about 10° from or after the TDC. The marker line 82 is the end of the power or driver stroke for the right pointer 80R. As a non-limiting example, the marker line 82 may be about 10° before the BDC.

FIG. 23 shows a schematic end view of the gear mechanism 2100 in the direction H indicated in FIG. 21, with the left pointer 80L (associated with the left pedal) illustrated at a position at the start of the return stroke. The dashed arrow shows the direction of travel of the pointer 80L rotating anticlockwise. The pointer 80L may be aligned with the marker line 84, which represents the start of the pedal return (or advancer) stroke. As a non-limiting example, the marker line 84 may be about 10° from or before the BDC. The marker line 83 is the end of the return or advancer stroke for the left pointer 80L. As a non-limiting example, the marker line 83 may be about 10° after the TDC.

It should be appreciated that the position of the pointer 80R at the start of its power stroke as illustrated in FIG. 22 coincides with the end of its preceding return stroke, while the position of the pointer 80L at the start of its return stroke as illustrated in FIG. 23 coincides with the end of its preceding power stroke.

FIG. 26 shows a schematic front view of the gear mechanism 2100, illustrated with the right pointer 80R at the end of its power stroke and the left pointer 80L at the end of its return stroke. FIG. 27 shows a schematic end view of the gear mechanism 2100 in the direction I indicated in FIG. 26, with the right pointer 80R (associated with the right pedal) aligned with the marker line 82, which represents the end of the pedal power stroke. At the same time, the right pointer 80R is now ready for its (subsequent) return or advancing stroke. In other words, the marker line 82 also represents the start of the return stroke for the pointer 80R. Referring to FIGS. 22 and 27, during the power stroke, the pointer 80R may travel through an arc of about 160° from the start of the power stroke illustrated in FIG. 22 to the end of the power stroke illustrated in FIG. 27.

FIG. 28 shows a schematic end view of the gear mechanism 2100 in the direction J indicated in FIG. 26, with the left pointer 80L (associated with the left pedal) aligned with the marker line 83, which represents the end of the pedal return stroke. At the same time, the left pointer 80L is now ready for its (subsequent) power or drive stroke (turning anti-clockwise). In other words, the marker line 83 also represents the start of the power stroke for the pointer 80L. Referring to FIGS. 23 and 28, during the return stroke, the pointer 80L may travel through an arc of about 200° from the start of the return stroke illustrated in FIG. 23 to the end of the return stroke illustrated in FIG. 28.

It should be appreciated that the return stroke for the right pointer 80R may be as correspondingly described for the left pointer 80L in the context of FIGS. 23 and 28, and the power stroke for the left pointer 80L may be as correspondingly described for the right pointer 80R in the context of FIGS. 22 and 27.

Non-limiting examples of the gears that may be used are as follows, where PCD means Pitch Circle Diameter of the gear:

(i) partial gears 60R, 60L may be based on an 18-teeth gear with PCD of 32.2 mm and of which 10 teeth may be used;

(ii) partial gears 61R, 61L may be based on a 20-teeth gear with PCD of 35.8 mm of which 10 teeth may be used;

(iii) partial gears 62R, 62L may be based on an 18-teeth gear with PCD of 36 mm of which 8 teeth may be used;

(iv) partial gears 63R, 63L may be based on a 16-teeth gear with PCD of 32 mm of which 8 teeth may be used;

(v) each of full gears 64 and 65 may have 17 teeth with PCD of 34 mm.

As described above, partial gear 61 drives partial gear 60 where the sum of the PCD of both gears is 68 mm. Further, partial gear 62 drives partial gear 63 where the sum of the PCD of both gears is 68 mm. The sum of the PCD of the two full gears 64 and 65 is 68 mm, which may help to maintain the two axes 50, 52 to be parallel to each other.

As non-limiting examples, due to the different relative sizes and numbers of teeth of the various partial gears, the right pointer 80R may rotate through 160° driving 8 teeth of the partial gear 62R on the spindle 70R. This may then drive the partial gear 63R through 180° (ratio of 18 to 16 teeth=160*18/16) on the spindle 72. The spindle 72 may rotate the partial gear 61L through 180°. This, in turn, may then drive the partial gear 60L through 200° (ratio of 20 to 18 teeth=180*20/18) on the spindle 70L, thus advancing the pointer (with pedal) 80L by 200°. At the same time, the full gear 65 has also rotated 180° on the spindle 72, driving the full gear 64 and the chain wheel 66 through 180° on the spindle 71. The corresponding sequence through the corresponding gears may be applicable when the left pointer 80L goes through the power stroke. The rotation through 160° leading to the rotation through 200° as described above may be preferable so as not to have a big variation in cadence.

As described, all gears 61R, 63R, 65, 61L, 63L on the spindle 72 may be rotated through the same angle or arc, e.g., 180°, during the respective or corresponding power stroke. Further, during any one power stroke, the chain wheel 66 may be rotated through 180°. As such, during operation, the wheels of the pedal-powered vehicle may rotate at a uniform speed during each cycle of a right pedal power stroke and a left pedal power stroke. This may mean that the chain wheel speed and the drive wheel speed may be constant at all times, with a constant output speed for the wheels of the pedal-powered vehicle.

Based on the values mentioned above and the parameters of the various gears as provided above, in various embodiments, the marker line 81 (FIGS. 22, 27) may be defined at 10° after TDC, and the marker line 82 (FIGS. 22, 27) may be defined at 160° from the marker line 81 or 10° before BDC, while the marker line 84 (FIGS. 23, 28) may be defined at 10° before BDC, and the marker line 83 (FIGS. 23, 28) may be defined at 200° from the marker line 84 or 10° after TDC. However, it should be appreciated that the positioning of any one of the marker lines 81, 82, 83, 84 may be varied to vary the angular travel distance of at least one of the pointers 80R, 80L for at least one of the corresponding power or return stroke. As non-limiting examples, this may be achieved by changing the parameter(s) of one or more of the partial gears 60R, 60L, 61R, 61L, 62R, 62L, 63R, 63L, such as changing the gear size (for example, by changing the PCD) and/or the number of teeth to be used. In some embodiments, for example, a power stroke may start at 20° after TDC, and/or may end at 20° before BDC. Correspondingly, a return stroke may start at 20° before BDC and/or may end at 20° after TDC. It should be appreciated that other configurations may be possible, for example, a power stroke that starts at 20° after TDC, and/or ends at 15° before BDC.

Referring to FIGS. 22, 23, 27, 28, as the pointer (with right pedal) 80R is rotated, clockwise, from the marker line 81 to the marker line 82, the pointer (with left pedal) 80L has advanced, anti-clockwise, from the marker line 84 to the marker line 83 in the same time and is now ready to commence its power stroke. The pointer 80L may then drive, anti-clockwise, from the marker line 83 to the marker line 84, advancing the pointer 80R, clockwise, from the marker line 82 to the marker line 81. The sequence then repeats.

It should be appreciated that if a pedal is rotated continuously in one direction, for example, when putting the chain on (e.g., onto chain wheel 66), then the next driving pedal may finish its driving stroke and reset the sequence described above automatically.

Further, it should be appreciated that when back pedalling (i.e., driven in reverse), then, the next driving pedal may pick its stroke and at its end, may reset the sequence.

FIGS. 29 to 40 show schematic views illustrating the orientation of the pointers (having corresponding pedals) 80R, 80L and their respective gears 60R, 61R, 62R, 63R, 60L, 61L, 62L, 63L during rotation of the pointers 80R, 80L from their respective start marker lines to their respective end marker lines. In the figures, the top gears rotate clockwise and the bottom gears rotate anti-clockwise as shown by the arrows. As described above, the spindle 70R has the partial gears 60R, 62R mounted or fixed to it, and the spindle 70L has the partial gears 60L, 62L mounted or fixed to it. The action of each of these will now be described in turn.

Figure 29:
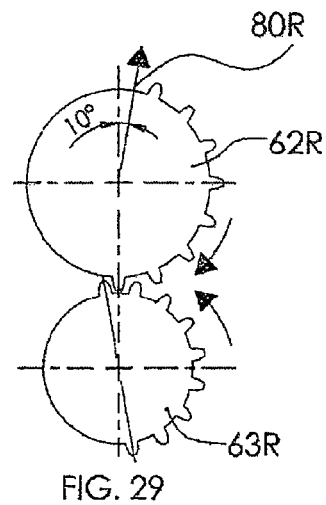
Figure 30:
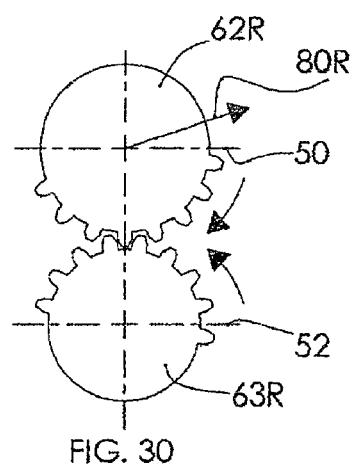
Figure 31:
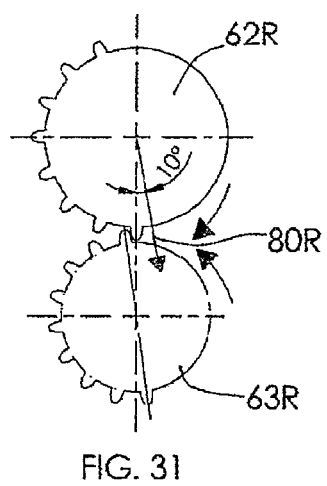

FIGS. 29 to 31 show schematic views of the (orientation of the) partial gears 62R, 63R corresponding to the right pointer (associated with right pedal) 80R during the power (or drive) stroke associated with the pointer 80R. FIG. 29 shows the start of the right pedal power stroke with the partial gear 62R on the spindle 70R and the partial gear 63R on the spindle 72 coming into engagement, with the pointer 80R at about 10° past the TDC. FIG. 30 shows the partial gears 62R, 63R part way (in an intermediate position) through the power stroke. FIG. 31 shows the orientation of the partial gears 62R, 63R at the end of the power stroke, where the partial gears 62R, 63R are coming out of engagement. The pointer 80R has rotated about 160° from the start of the power stroke, and is at about 10° before the BDC at the end of the power stroke, which also coincides with the position of the pointer 80R for the start of its next return (advancing) stroke.

Figure 32:
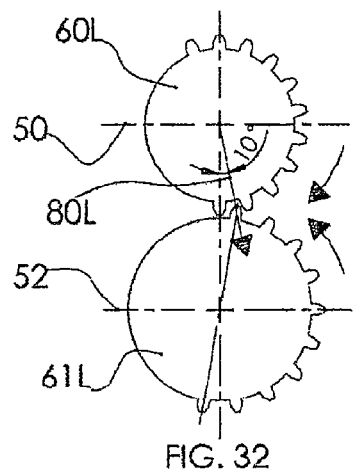
FIGS. 29 to 40 show schematic views illustrating the orientation of the pointers and their respective gears during rotation of the pointers.
Figure 33:
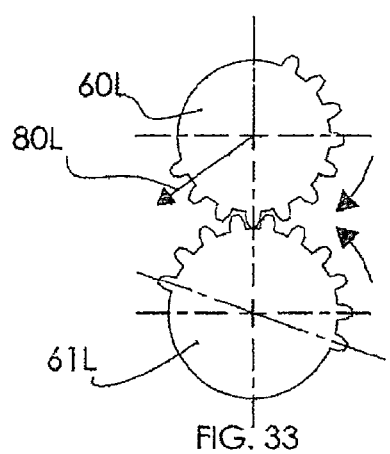
Figure 34:
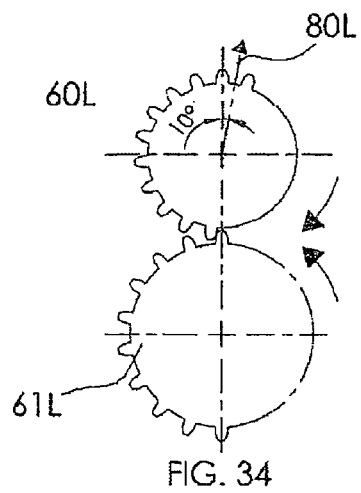

FIGS. 32 to 34 show schematic views of the (orientation of the) partial gears 60L, 61L corresponding to the left pointer (associated with left pedal) 80L during the return (or advancing) stroke associated with the pointer 80L. FIG. 32 shows the start of the left pedal return stroke with the partial gear 60L on the spindle 70L and the partial gear 61L on the spindle 72 coming into engagement, with the pointer 80L at about 10° before the BDC. FIG. 33 shows the partial gears 60L, 61L part way (in an intermediate position) through the return stroke. FIG. 34 shows the orientation of the partial gears 60L, 61L at the end of the return stroke, where the partial gears 60L, 61L are coming out of engagement. The pointer 80L has rotated about 200° from the start of the return stroke, and is at about 10° past the TDC at the end of the return stroke, which also coincides with the position of the pointer 80L for the start of its next power (drive) stroke. The orientation/positioning of the partial gears 60L, 61L and the pointer 80L illustrated in FIGS. 32, 33, 34 correspond to the same time as those of the partial gears 62R, 63R and the pointer 80R illustrated in FIGS. 29, 30, 31 respectively.

Figure 35:
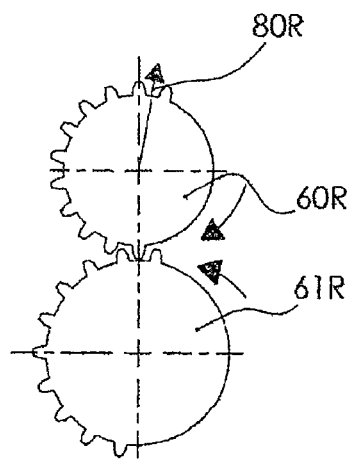
Figure 36:
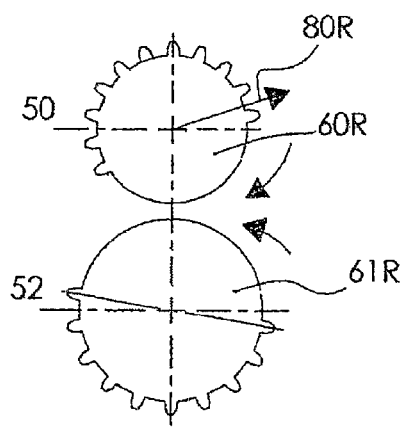
Figure 37:
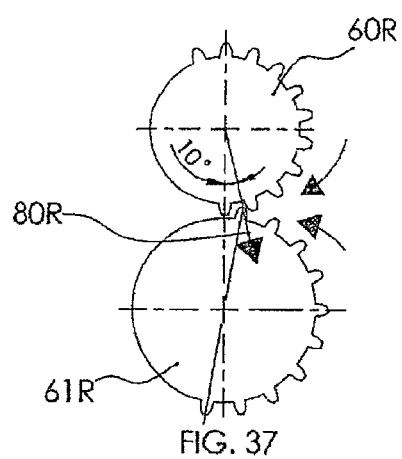

FIGS. 35 to 37 show schematic views of the (orientation of the) partial gears 60R, 61R corresponding to the right pointer (associated with right pedal) 80R during the power (or drive) stroke associated with the pointer 80R. FIG. 35 shows the end of the previous return stroke with the partial gear 60R on the spindle 70R and the partial gear 61R on the spindle 72 coming out of engagement, with the pointer 80R at about 10° past the TDC. FIG. 36 shows the partial gears 60R, 61R part way (in an intermediate position) through the right pedal power stroke whilst the right pointer 80R is driving, where there is no engagement for advancing between the partial gears 60R, 61R. FIG. 37 shows the orientation of the partial gears 60R, 61R for the start of the next return stroke, coinciding with the end of the right pedal power stroke, where the partial gears 60R, 61R are coming back into engagement to commence their return stroke. As shown in FIGS. 35 to 37, similar to FIGS. 29 to 31, the pointer 80R has rotated about 160°, and is at about 10° before the BDC.

Figure 38:
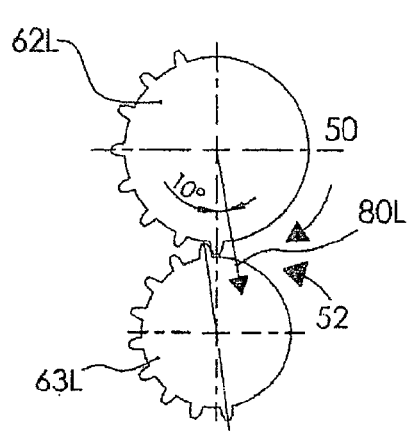
Figure 39:
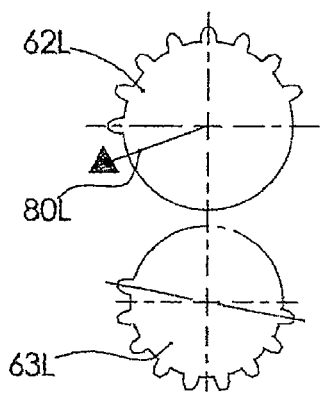
Figure 40:
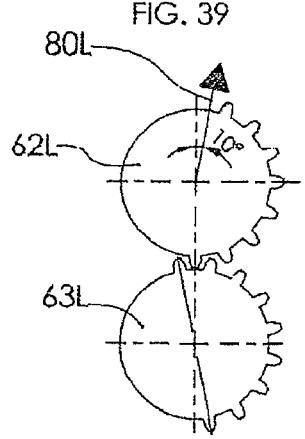

FIGS. 38 to 40 show schematic views of the (orientation of the) partial gears 62L, 63L corresponding to the left pointer (associated with left pedal) 80L during the return (or advancing) stroke associated with the pointer 80L. FIG. 38 shows the end of the previous power stroke with the partial gear 62L on the spindle 70L and the partial gear 63L on the spindle 72 coming out of engagement, with the pointer 80L at about 10° before the BDC. FIG. 39 shows the partial gears 62L, 63L part way (in an intermediate position) through the left pedal return stroke whilst the left pointer 80L is advancing, where there is no engagement for power drive between the partial gears 62L, 63L. FIG. 40 shows the orientation of the partial gears 62L, 63L for the start of the next power stroke, coinciding with the end of the left pedal return stroke, where the partial gears 62L, 63L are coming into engagement to commence their power stroke. As shown in FIGS. 38 to 40, similar to FIGS. 32 to 34, the pointer 80L has rotated about 200°, and is at about 10° past the TDC.

The description in the context of FIGS. 29 to 40 may be applicable during the power stroke associated with the left pointer 80L, and coinciding with the return stroke associated with the right pointer 80R, with the corresponding gears associated with the right pointer 80R being exchanged with those associated with the left pointer 80L.

FIG. 41 show schematic views of the gear mechanism (or pedal advancer) 2200, illustrating a schematic cross-sectional view, and schematic end views in the respective directions K, L (showing only the casing or support structure 40a that supports or holds the various components of the gear mechanism 2200, with just the upper member (or cover) 41a and the intermediate portion 48a of the support structure 40a shown in direction K, and the upper member 41a, the intermediate portion 48a and the lower member 42a of the support structure 40a show in direction L). Like features or components of the gear mechanism 2100 illustrated in FIGS. 21 to 28 that are similarly present in the gear mechanism 2200 are denoted in the gear mechanism 2200 by like reference numerals (with letters "R" or "L", where necessary, denoting respective right and left sides) and ending with a suffix "a", and which may be as correspondingly described above and therefore their descriptions are omitted here. One difference with the gear mechanism 2200 is that the spindles 70Ra, 71a may be coaxial with each other in that the spindle 71a may be rotatable about the spindle 70Ra. The spindle 71a may be arranged surrounding part of the spindle 70Ra such that the spindle 71a may be an outer spindle and the spindle 70Ra may be an inner spindle. Further, in the gear mechanism 2200, the single spindle 72a may be an upper spindle, while the three spindles 70Ra, 70La, 71a may be lower spindles. Further, the upper member (or cover) 41a and/or the lower member 42a of the support structure 40a may be removable from the intermediate (or central) portion 48a of the support structure 40a.

Figure 42:
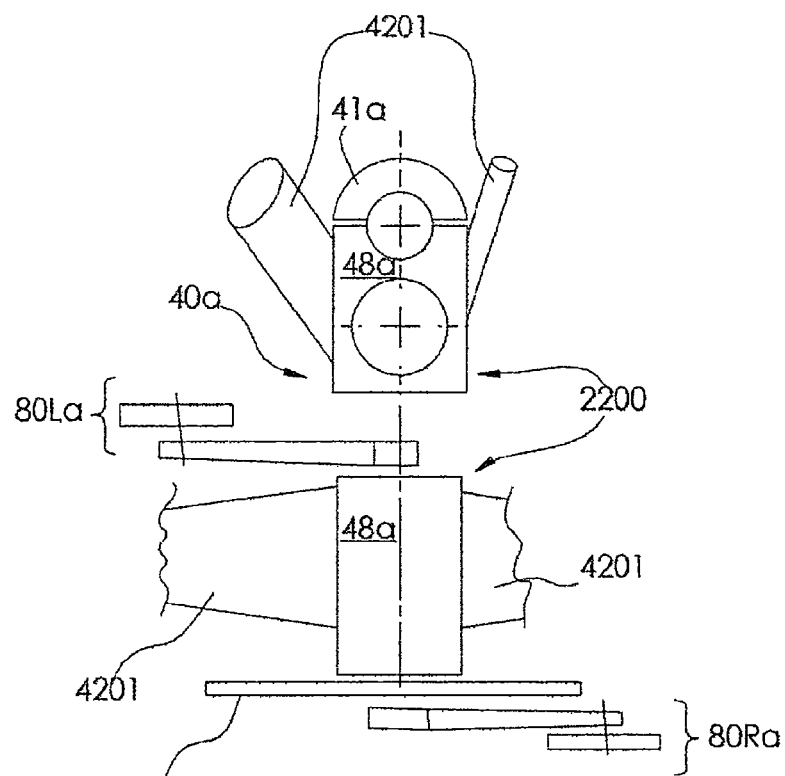
FIG. 42 shows schematic views of the gear mechanism being attached to a bicycle frame.

The gear mechanism 2200 may be attached to a bicycle frame 4201, as shown in FIG. 42, with the intermediate portion 48a of the support structure or housing 40a fixed to the bike frame 4201, replacing prior art bottom bracket. There is also shown in FIG. 42 a plan view illustrating part of the frame 4201, the intermediate portion 48a (with the upper member 41a removed), respective pedals and crank arms (collectively indicated by 80Ra, 80La) and the drive wheel chain sprocket 66a.

Figure 43:
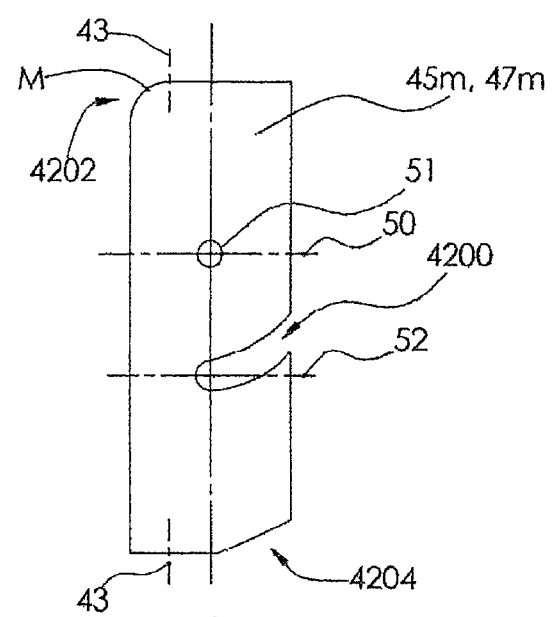
FIG. 43 shows a schematic view of a modified upright member with curved slot and edges.

As non-limiting examples, and for purposes of demonstrating the workings of the gear mechanism, models for the gear mechanism 2100 (see FIGS. 21, 24, 25) with support structure 40 (see FIGS. 7, 8) have been built in-house, made from paper and wood. Construction of the model will now be described. All gears were made from a thick paper about 300 GSM using a template. This thickness of paper was easier to cut with a crafts knife. White wood glue was found to be best and the only glue used. Layers of cut paper gears were glued to make a thickness of about 3 mm. After drying, the gear teeth were lightly rubbed with sand paper to smooth the surfaces. All surfaces of the teeth were then sealed with glue. Central holes were drilled using standard steel drill bits. Once fully dried, the teeth were lubricated by candle wax using birthday cake candles which fitted well in the small teeth. The spindles were made from wooden barbecue skewers. The gears were glued to the spindles. The pointers were made from wood and glued to their respective spindles after assembling the gears in the housing. During initial assembly and setting up, a need arose to remove the middle upright members 45, 47 (see FIGS. 7, 21) without disassembling the lower gear assembly 154 (see FIG. 18) of FIG. 21. This was facilitated by making a curved slot 4200 in modified upright members 45m, 47m for the support structure (e.g., 40, FIG. 7,8), as shown in FIG. 43, instead of holes 53 in the upright members 45, 47 (FIGS. 7, 8). Each of the modified upright members 45m, 47m may have curved edges 4202, 4204. The middle upright members 45m, 47m may rotate about point M (at curved edge 4202) for withdrawal by removing the screws 43 from the members 45m, 47m and loosening the other screws. For clarity, opening 51 and axes 50, 52 are illustrated in FIG. 43 for the modified upright members 45m, 47m.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A gear mechanism for a pedal-powered vehicle, the gear mechanism comprising:
    a gear arrangement of centrally mounted concentric gears;
    a spindle arrangement configured to support the gear arrangement, the spindle arrangement comprising a first spindle, a second spindle, a third spindle and a fourth spindle,
    wherein the gear arrangement comprises:
        a first set of gears mounted on the first spindle and the fourth spindle, the first set of gears being arranged to be driven via a first pedal of the pedal-powered vehicle;
        a second set of gears mounted on the second spindle and the fourth spindle, the second set of gears being arranged to be driven via a second pedal of the pedal-powered vehicle; and
        a third set of gears mounted on the third spindle and the fourth spindle,
    wherein, for each of the first and second sets of gears, the set of gears is configured to be alternately driven, via the corresponding pedal being rotated through less than 180°, in a power stroke to drive the third set of gears for propelling the pedal-powered vehicle, and, advanced, via the corresponding pedal being rotated through more than 180°, in a return stroke to commence a subsequent power stroke, and
    wherein the first set of gears comprises:
    a first pair of partial gears comprising:
        a first partial gear, that has teeth on the circumference subtending an angle of less than 180°, mounted on the first spindle; and
        a second partial gear mounted on the fourth spindle,
        wherein the first and second partial gears are arranged to engage each other in the power stroke associated with the first set of gears; and
    a second pair of partial gears comprising:
        a third partial gear, that has teeth on the circumference subtending an angle of more than 180°, mounted on the first spindle; and
        a fourth partial gear mounted on the fourth spindle,
        wherein the third and fourth partial gears are arranged to engage each other in the return stroke associated with the first set of gears.

2. The gear mechanism as claimed in claim 1, wherein the first spindle, the second spindle and the third spindle are arranged along a first axis, and wherein the fourth spindle is arranged along a second axis.

3. The gear mechanism as claimed in claim 2, wherein the first spindle, the second spindle and the third spindle are arranged side-by-side.

4. The gear mechanism as claimed in claim 2, wherein one of the first spindle and the third spindle is arranged rotatable about the other of the first spindle and the third spindle.

5. The gear mechanism as claimed in any one of claims 1 to 4, wherein the third spindle is adapted to be arranged independently of crank arms of the pedal-powered vehicle.

6. The gear mechanism as claimed in claims 1-5, wherein the second set of gears comprises:
a first pair of partial gears comprising:
a first partial gear mounted on the second spindle; and
a second partial gear mounted on the fourth spindle,
wherein the first and second partial gears are arranged to engage each other in the power stroke associated with the second set of gears; and
a second pair of partial gears comprising:
a third partial gear mounted on the second spindle; and
a fourth partial gear mounted on the fourth spindle,
wherein the third and fourth partial gears are arranged to engage each other in the return stroke associated with the second set of gears.

7. The gear mechanism as claimed in any one of claims 1-5 or 6, wherein the third set of gears comprises:
a first full gear mounted on the third spindle; and
a second full gear mounted on the fourth spindle,
wherein the first and second full gears are arranged to engage each other for propelling the pedal-powered vehicle.

8. The gear mechanism as claimed in any one of claim 2-5 or 6, wherein each of the first, second and third sets of gears comprise a plurality of circular gears.

9. The gear mechanism as claimed in any one of claims 1-5 or 6-8, wherein, for each of the first and second sets of gears, the set of gears is configured to be alternately driven in the power stroke via the corresponding pedal being rotated through 160°, and advanced in the return stroke via the corresponding pedal being rotated through 200°.

10. The gear mechanism as claimed in any one of claims 1-5 or 6-9, wherein, for each of the first and second sets of gears, the set of gears is configured to be driven in the power stroke to drive the third set of gears to rotate the third spindle through 180°.

11. The gear mechanism as claimed in any one of claims 1-5 and 6-10, further comprising a chain wheel mounted on the third spindle.

12. The gear mechanism as claimed in any one of claims 1-5 and 6-11, wherein, for each of the first and second sets of gears, the set of gears is configured, in the power stroke, to drive the third set of gears for propelling the pedal-powered vehicle at a constant wheel speed.

13. The gear mechanism as claimed in any one of claims 1-5 and 6-12, further comprising a support structure to support the gear arrangement and the spindle arrangement.

14. A pedal-powered vehicle comprising the gear mechanism as claimed in any one of claims 1-5 and 6-13.

15. The pedal-powered vehicle as claimed in claim 14, wherein the pedal-powered vehicle comprises:
a first pedal, and a first crank arm coupling the first pedal to the first spindle; and
a second pedal, and a second crank arm coupling the second pedal to the second spindle.

16. The pedal-powered vehicle as claimed in claim 15, wherein the third spindle is arranged independently of the first and second crank arms.

17. The pedal-powered vehicle as claimed in any one of claims 14 to 16, wherein the pedal-powered vehicle is a bicycle.

18. A method for forming a gear mechanism for a pedal-powered vehicle, the method comprising:
supporting a centrally mounted concentric gear arrangement on a spindle arrangement, comprising:
mounting a first set of gears of the gear arrangement on a first spindle of the spindle arrangement and a fourth spindle of the spindle arrangement, the first set of gears being arranged to be driven via a first pedal of the pedal-powered vehicle;
mounting a second set of gears of the gear arrangement on a second spindle of the spindle arrangement and the fourth spindle, the second set of gears being arranged to be driven via a second pedal of the pedal-powered vehicle; and
mounting a third set of gears of the gear arrangement on a third spindle of the spindle arrangement and the fourth spindle,
wherein, for each of the first and second sets of gears, the set of gears is configured to be alternately driven, via the corresponding pedal being rotated through less than 180°, in a power stroke to drive the third set of gears for propelling the pedal-powered vehicle, and, advanced, via the corresponding pedal being rotated through more than 180°, in a return stroke to commence a subsequent power stroke, and
wherein the first set of gears comprises:
a first pair of partial gears comprising a first partial gear that has teeth on the circumference subtending an angle of less than 180° and a second partial gear; and
a second pair of partial gears comprising a third partial gear, that has teeth on the circumference subtending an angle of more than 180° and a fourth partial gear,
wherein mounting the first set of gears comprises:
mounting the first partial gear on the first spindle, and mounting the second partial gear on the fourth spindle, wherein the first and second partial gears are arranged to engage each other in the power stroke associated with the first set of gears; and
mounting the third partial gear on the first spindle, and mounting the fourth partial gear on the fourth spindle, wherein the third and fourth partial gears are arranged to engage each other in the return stroke associated with the first set of gears, and
wherein the second set of gears comprises:
a first pair of partial gears comprising a first partial gear that has teeth on the circumference subtending an angle of less than 180° and a second partial gear; and
a second pair of partial gears comprising a third partial gear, that has teeth on the circumference subtending an angle of more than 180° and a fourth partial gear,
wherein mounting the second set of gears comprises:
mounting the first partial gear on the second spindle, and mounting the second partial gear on the fourth spindle, wherein the first and second partial gears are arranged to engage each other in the power stroke associated with the second set of gears; and
mounting the third partial gear on the second spindle, and mounting the fourth partial gear on the fourth spindle, wherein the third and fourth partial gears are arranged to engage each other in the return stroke associated with the second set of gears.

\* \* \* \* \*